US010902175B1

(12) United States Patent
Surprise et al.

(10) Patent No.: US 10,902,175 B1
(45) Date of Patent: Jan. 26, 2021

(54) CROSS-HIERARCHICAL BLOCK PIN PLACEMENT

(71) Applicant: INTERNATIONAL BUSINESS MACHINES CORPORATION, Armonk, NY (US)

(72) Inventors: Jesse Surprise, Highland, NY (US); Gerald Strevig, III, Cedar Park, TX (US); Shawn Kollesar, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/567,118

(22) Filed: Sep. 11, 2019

(51) Int. Cl.
*G06F 17/50* (2006.01)
*G06F 30/394* (2020.01)

(52) U.S. Cl.
CPC .................. *G06F 30/394* (2020.01)

(58) Field of Classification Search
USPC .............. 716/104, 105, 114, 118, 119, 126
See application file for complete search history.

(56) References Cited

U.S. PATENT DOCUMENTS

| | | | | |
|---|---|---|---|---|
| 6,154,719 A * | 11/2000 | Saitoh | .................. | G06F 30/33 703/13 |
| 6,289,494 B1 * | 9/2001 | Sample | .............. | G06F 15/7867 716/104 |
| 6,421,818 B1 * | 7/2002 | Dupenloup | ............. | G06F 30/30 716/105 |
| 7,913,216 B2 | 3/2011 | Chan et al. | | |
| 8,010,922 B2 * | 8/2011 | Malgioglio | ........... | G06F 30/327 716/114 |
| 8,751,986 B2 | 6/2014 | Arunachalam et al. | | |
| 2002/0177990 A1 | 11/2002 | Sample | | |

(Continued)

OTHER PUBLICATIONS

Papadimitriou, et al., "A Multiple Fault Injection Methodology based on Cone Partitioning towards RTL Modeling of Laser Attacks," Conference: Design, Automation and Test in Europe Conference and Exhibition, Mar. 2014, 5 pages.

(Continued)

*Primary Examiner* — Brian Ngo
(74) *Attorney, Agent, or Firm* — Cantor Colburn LLP; William Kinnaman

(57) ABSTRACT

Methods, systems and computer program products for providing cross-hierarchical block pin placement are provided. Aspects include designating potential pin placements by aligning output pins of each of a first set of bottom-level hierarchical blocks positioned within one or more middle-level hierarchical blocks to an edge of a respective middle-level hierarchical block. Responsive to determining that each of a first subset of a second set of bottom-level hierarchical blocks having input pins that correspond to the output pins of the first set of bottom-level hierarchical blocks are positioned within a respective middle-level hierarchical block that has a cross hierarchical alignment, aspects include placing pins at one or more of the potential pin placements. Aspects also include placing a set of pins based on aligning input pins of a second subset of the second set of bottom-level hierarchical blocks to an edge of a respective middle-level hierarchical block.

20 Claims, 12 Drawing Sheets

(56) References Cited

U.S. PATENT DOCUMENTS

| | | | |
|---|---|---|---|
| 2008/0066039 A1* | 3/2008 | Berry | G06F 30/30 |
| | | | 257/773 |
| 2013/0125097 A1* | 5/2013 | Ebcioglu | G06F 8/40 |
| | | | 717/136 |
| 2015/0213159 A1 | 7/2015 | Arunachalam | |
| 2019/0065356 A1* | 2/2019 | Hagendorf | G06F 11/3664 |

OTHER PUBLICATIONS

Transmittal Form PTO/SB/21 signed Mar. 17, 2020.

* cited by examiner

CROSS-HIERARCHICAL BLOCK PIN PLACEMENT

BACKGROUND

The present invention generally relates to the fabrication and design of semiconductor chips and integrated circuits, and more specifically, to providing cross-hierarchical block pin placement.

A microelectronic integrated circuit (IC) chip can generally be thought of as a collection of logic cells with electrical interconnections between the cells, formed on a semiconductor substrate (e.g., silicon). An IC may include a very large number of cells and require complicated connections between the cells. Cell placement in semiconductor fabrication involves a determination of where particular cells should optimally (or near-optimally) be located on the surface of an integrated circuit device. The design of such IC's generally have various design requirements, such as timing requirements, that must be satisfied by the placement of various circuit elements (e.g., cells, latches, local clock buffers, etc.). For reducing the complexity of the design process, designs are commonly created using hierarchical blocks that may connect, to one another. The locations of pins (along the edge of hierarchical blocks) that used to transmit signals between different blocks can impact timing, routing and congestion characteristics of a given design.

SUMMARY

Embodiments of the present invention are directed to providing cross-hierarchical block pin placement. A non-limiting example computer-implemented method includes designating a first set of potential pin placements by aligning output pins of each of a first set of bottom-level hierarchical blocks positioned within one or more middle-level hierarchical blocks to an edge of a respective middle-level hierarchical block. The one or more middle-level hierarchical blocks are positioned within a top-level hierarchical block of a circuit design. Responsive to determining that each of a first subset of a second set of bottom-level hierarchical blocks having input pins that correspond to the output pins of the first set of bottom-level hierarchical blocks are positioned within a respective middle-level hierarchical block that has a cross hierarchical alignment, the method includes placing a corresponding one or more middle-level hierarchical pins at one or more of the first set of potential pin placements. The method also includes placing a set of middle-level hierarchical pins at a second set of potential pin placements designated by aligning input pins of a second subset of the second set of bottom-level hierarchical blocks to an edge of a respective middle-level hierarchical block.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
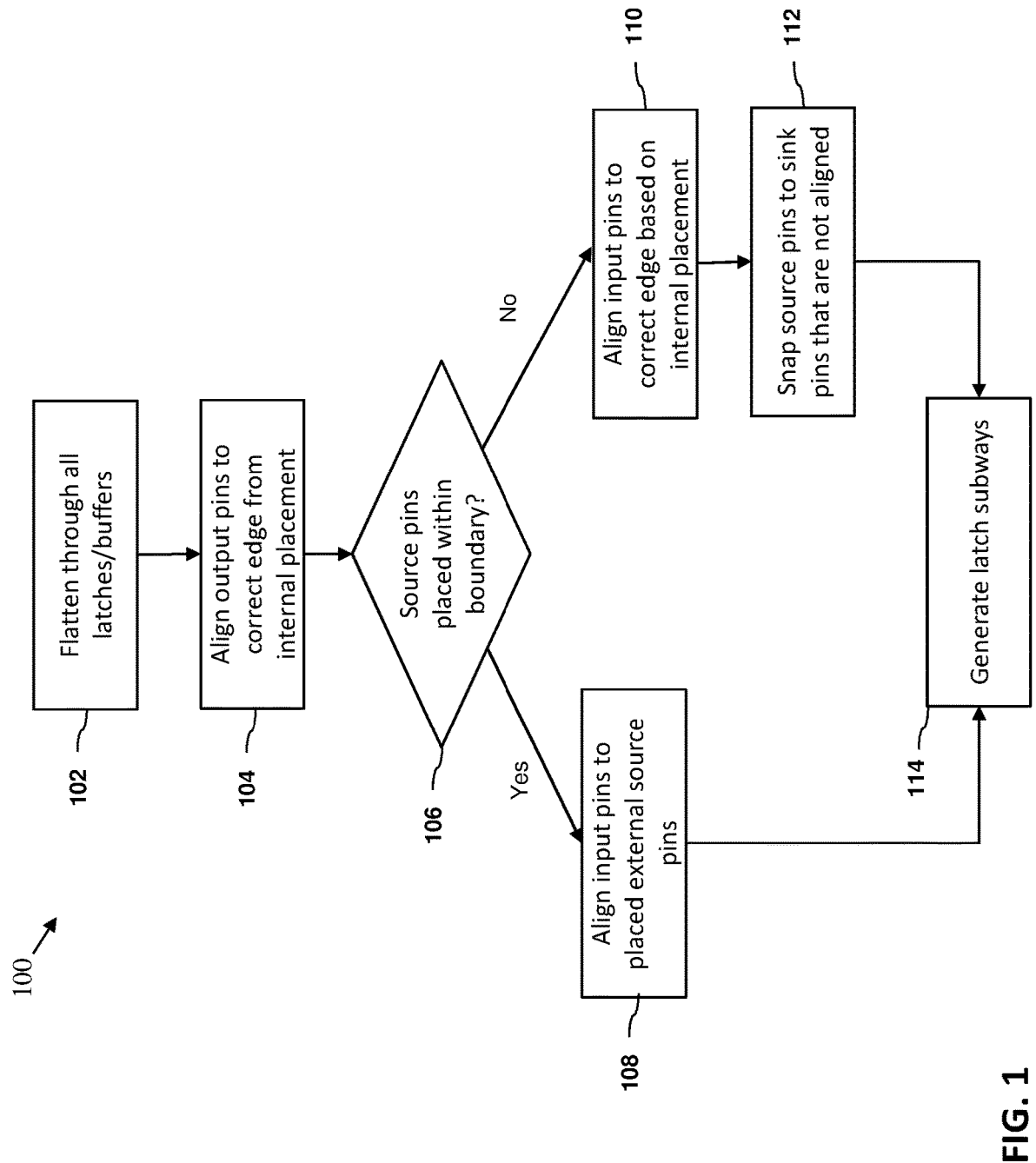
FIG. 1 illustrates a flow diagram of a process for providing cross-hierarchical block pin placement in accordance with one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Integrated circuits are used for a wide variety of electronic applications, from simple devices such as wristwatches to the most complex computer systems. A microelectronic integrated circuit (IC) chip can generally be thought of as a collection of logic cells with electrical interconnections between the cells, formed on a semiconductor substrate (e.g., silicon). An IC may include a very large number of cells and require complicated connections between the cells. A cell is a group of one or more circuit elements such as transistors, capacitors, resistors, inductors, and other basic circuit elements grouped to perform a logic function. Cell types include, for example, core cells, scan cells and input/output (I/O) cells. Each of the cells of an IC may have one or more pins, each of which in turn may be connected to one or more other pins of the IC by wires. The wires connecting the pins of the IC are also formed on the surface of the chip. For more complex designs, there are typically at least four distinct layers of conducting media available for routing, such as a polysilicon layer and three metal layers (metal-1, metal-2, and metal-3). The polysilicon layer, metal-1, metal-2, and metal-3 are all used for vertical and/or horizontal routing.

An IC chip is fabricated by first conceiving the logical circuit description, and then converting that logical description into a physical description, or geometric layout. This process is usually carried out using a "netlist," which is a record of all of the nets, or interconnections/wiring, between the cell pins. A layout (which may be referred to as "a circuit design") typically includes of a set of planar geometric shapes in several layers. The layout is then checked to ensure that it meets all of the design requirements, particularly timing requirements. The result is a set of design files known as an intermediate form that describes the layout. The design files are then converted into pattern generator files that are used to produce patterns called masks by an optical or electron beam pattern generator. During fabrication, these masks are used to pattern a silicon wafer using a sequence of photolithographic steps. The process of converting the specifications of an electrical circuit into a layout is called the physical design.

Cell placement in semiconductor fabrication involves a determination of where particular cells should optimally (or near-optimally) be located on the surface of an integrated circuit device. Due to the large number of components and the details required by the fabrication process for very large scale integrated (VLSI) devices, physical design is not practical without the aid of computers. As a result, most phases of physical design extensively use computer-aided design (CAD) tools, and many phases have already been partially or hilly automated. Automation of the physical design process has increased the level of integration, reduced turnaround time and enhanced chip performance. Several different programming languages have been created for electronic design automation (EDA) including Verilog, very high speed integrated circuit hardware description language (VHDL) and time division multiplexing logic (TDML). A typical EDA system receives one or more high level behavioral descriptions of an IC device, and translates this high level design language description into netlists of various levels of abstraction.

Turning now to an overview of technologies that are more specifically relevant to aspects of the invention, different hierarchical blocks or macro blocks can be used in laying out a circuit design (e.g., an integrated circuit design). Higher levels of hierarchical blocks can have child cells (i.e., lower levels of hierarchical blocks) within them. Middle-level hierarchical blocks often have connections between them facilitated by pins, and the locations of these connections affect routability and timing. A macro block can be a predetermined or standardized block that may contain billions of transistors. Use of macro blocks can provide a useful layer of hierarchical abstraction for designing an integrated circuit such that macro blocks can be placed and connected to one another within the circuit design. Many different levels of abstraction can be used. For example, in some embodiments, a macro-box may be considered to be a bottom-level hierarchical block that can be positioned in a larger middle-level hierarchical block that can further be positioned in a larger top-level hierarchical block. In other words, a top-level hierarchical block may can contain a plurality of middle-level hierarchical blocks that may in turn each contain a plurality of bottom-level hierarchical blocks (e.g., macro blocks). Use of such hierarchical blocks is useful in circuit design because the blocks can be placed and moved relative to one another in a floor plan without having to individually move or adjust every element that is otherwise contained with the block. However, once placed, hierarchical blocks (e.g., middle-level hierarchical blocks) will need to have pins placed on the blocks to allow for electrical connections to exist between the hierarchical blocks so that signals may flow between blocks as necessary to perform the functionalities of the circuit diagram. Conventionally, pin placement has been achieved following and in accordance with either a top-level or bottom-level optimization. However, placing pins by using only top-level or bottom-level optimization can create problems such as misalignment of pins at the top level, which can result in routing problems when pins are misaligned, or scenic wiring when pins are placed sub-optimally. For example, in some cases, pins may be clumped together in a corner because from a top-level perspective this presents an optimal placement, however such placements may create significant congestion issues in one or more bottom-level blocks that is not optimal for the overall design. Therefore, it is desirable to place pins on hierarchical blocks by taking both top and bottom level perspectives into account.

Turning now to an overview of the aspects of the invention, one or more embodiments of the invention address one or more of the above-described shortcomings of the prior art by providing techniques for providing cross-hierarchical block pin placement that can unify the top down and bottom up pin placement techniques into a merged solution that provides better results than either technique produced individually. The disclosed techniques can result in the top-level hierarchical placement of pins between middle-level hierarchical blocks based on the positions of bottom-level hierarchical blocks. The invention can use timing information to determine pin layers for the hierarchical blocks. The timing information can be obtained from timing-based wire tags on a model that flattens through the hierarchical block. This is advantageous because timing is cross-hierarchy, including both top-level and bottom-level timing data. The bottom-level information (i.e., underlying logic structure) can be used to determine where edge pins should be placed in order to line up with internal logic, reduce pin and routing congestion in macro corners, and reduce scenic pinning in some cases. Top-level information can be used to align pins along common alleys, and ensure pins are placed on the correct macro edge (i.e., no scenic pinning). Bottom-up information can be used to reduce congestion in the corner of hierarchical blocks and also helps top-level routing congestion through better spreading.

Turning now to a more detailed description of aspects of the present invention, FIG. 1 depicts a flow diagram of a method 100 for providing cross-hierarchical block pin placement in accordance with an embodiment is shown. FIGS. 2A through 2F illustrate stages of an example placement of cross-hierarchical pins on middle-level hierarchical blocks in accordance with the techniques described herein, such as method BB00. In one or more embodiments of the present invention, the method 100 may be embodied in software that is executed by computer elements included in computer 300 shown in FIG. 3, or by computer elements located within a network that may reside in the cloud, such as the cloud computing environment 50 described herein above and illustrated in FIGS. 5 and 6. In other embodiments, the computer elements may reside on a computer system or processing system, such as the processing system 700 described herein above and illustrated in FIG. 7, or in some other type of computing or processing environment.

Figure 2A:
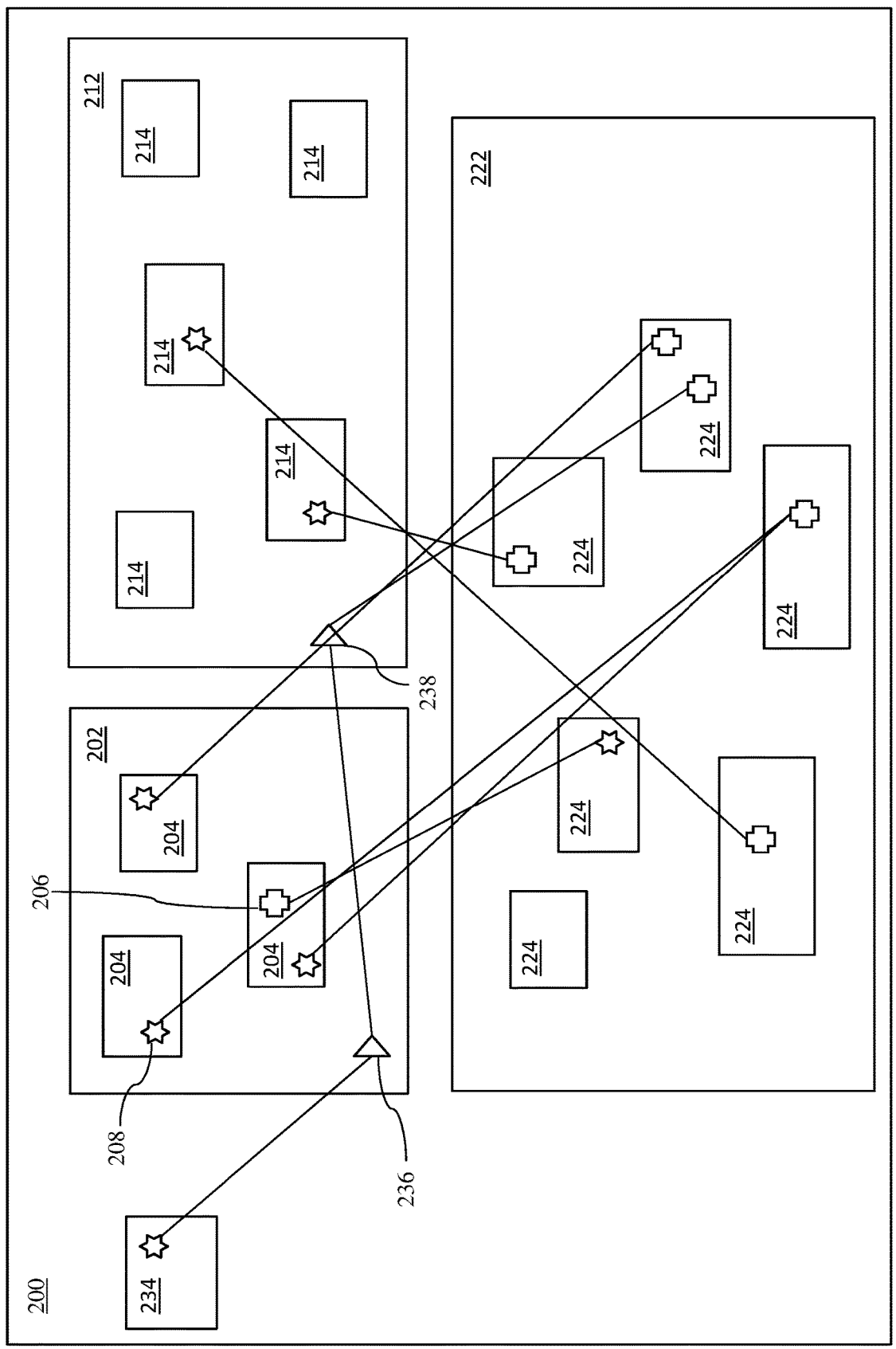
FIG. 2A illustrates an example first stage of a process for providing cross-hierarchical block pin placement within a hierarchical circuit design in accordance with one or more embodiments of the present invention.

The method 100 begins at block 102 and includes flattening through all latches and/or buffers (including any latch banks) at all levels of hierarchy. FIG. 2A depicts a portion of a circuit design having a top-level hierarchical block 200 that includes a first middle-level hierarchical block 202 that includes a respective plurality of bottom-level hierarchical blocks 204, a second middle-level hierarchical block 212 that includes a respective plurality of bottom-level hierarchical blocks 214 and a third middle-level hierarchical block 222 that includes a respective plurality of bottom-level hierarchical blocks 224. The top-level hierarchical block 200 also includes an external bottom-level hierarchical block 234 that is external to any middle-level hierarchical block. In the example shown in FIG. 2A, the external bottom-level hierarchical block 234 is connected to (i.e., is configured to pass a signal to) a first latch (or buffer) 236 positioned within the first middle-level hierarchical block 202, which is then connected to a second latch (or buffer) 238 positioned within the second middle-level hierarchical block 212 before ultimately being connected to a bottom-level hierarchical block 224 positioned in the third middle-level hierarchical block 222.

According to some embodiments, each bottom-level hierarchical block can be a macro or a predefined sub-circuit. According to some embodiments, the top-level hierarchical block can be referred to as the chip, the middle-level hierarchical blocks can be referred to as hierarchical blocks and the bottom-level hierarchical blocks can be referred to as macros and/or logical blocks, although it will be understood that blocks of each level of hierarchy can represent one or more circuits and/or pre-defined sub-circuits. As shown in FIG. 2A, one or more of the bottom-level hierarchical blocks may include output pins 206 (represented by a cross/plus shape) which may connect to respective input pins 208 (represented by a star shape) of other bottom-level hierarchical blocks. According to some embodiments, a given bottom-level hierarchical block may include more than one output pins 206 and/or input pins 208. To enable each output/input (which may also be referred to as "source/sink") pair of bottom-level hierarchical blocks to be electrically connected so that a signal may pass from the output pin 206 of a source bottom-level hierarchical block positioned within a first middle-level hierarchical block to the input pin 208 of the corresponding sink bottom-level hierarchical block positioned within a different, second middle-level hierarchical block, pins (which may be referred to as "middle-level hierarchical pins") will be positioned between the respective middle-level hierarchical blocks in accordance with the method 100. To position the middle-level hierarchical pins by taking into account information of different levels of hierarchy, the latches/buffers 236, 238 may be flattened through all levels of hierarchy, which means that they are not treated as anchor points but that the system can "see through" the latches/buffers to the ultimate anchor point (i.e., the input or output pin of a bottom-level hierarchical block). Thus, for example, when the first latch 236 and second latch 238 are flattened, the system can see that the input pin 208 of the external bottom-level hierarchical block 234 ultimately connects to an output pin 206 of a bottom-level hierarchical block 224 in the third middle-level hierarchical block 222.

According to some embodiments, the method 100 can include tagging each net (i.e., each wire connecting an output pin 206 of one bottom-level hierarchical block to the input pin 208 of another bottom-level hierarchical block) with a wirecode use layer pair. As will be understood by those of skill in the art, an IC can include 16 layers of metal (alternating horizontal and vertical layers) and the wirecode use layer pair tag indicates which layers the middle-level hierarchical pin will go on for the respective net. Thus, according to some embodiments, each middle-level hierarchical pin will be placed on the tagged use layer of the net, except if the net is tagged Mx (i.e., the lowest layer of metal), in which case the middle-level hierarchical pin will be placed on the Cx layer (i.e., the next highest level of metal above Mx), as the Mx level of metal is generally the slowest metal layer such that for any reasonably long net (i.e., any net between hierarchical blocks), it can be assumed that the Cx layer can be used for pin placement. According to some embodiments, each middle-level hierarchical pin can be placed according to a pin specification, which can specify for example, a minimum distance that the middle-level hierarchical pins must be spaced apart from one another. According to some embodiments, custom latch trees may be an exception to the flattening step of block 102. In other words, in some embodiments, there may be cases where latch trees have a large number of sinks and are very complex (e.g., latch trees that may have been designed by hand), and in these cases, the system may treat the latch as the anchor point instead of going all the way to the source/sink.

Figure 2B:
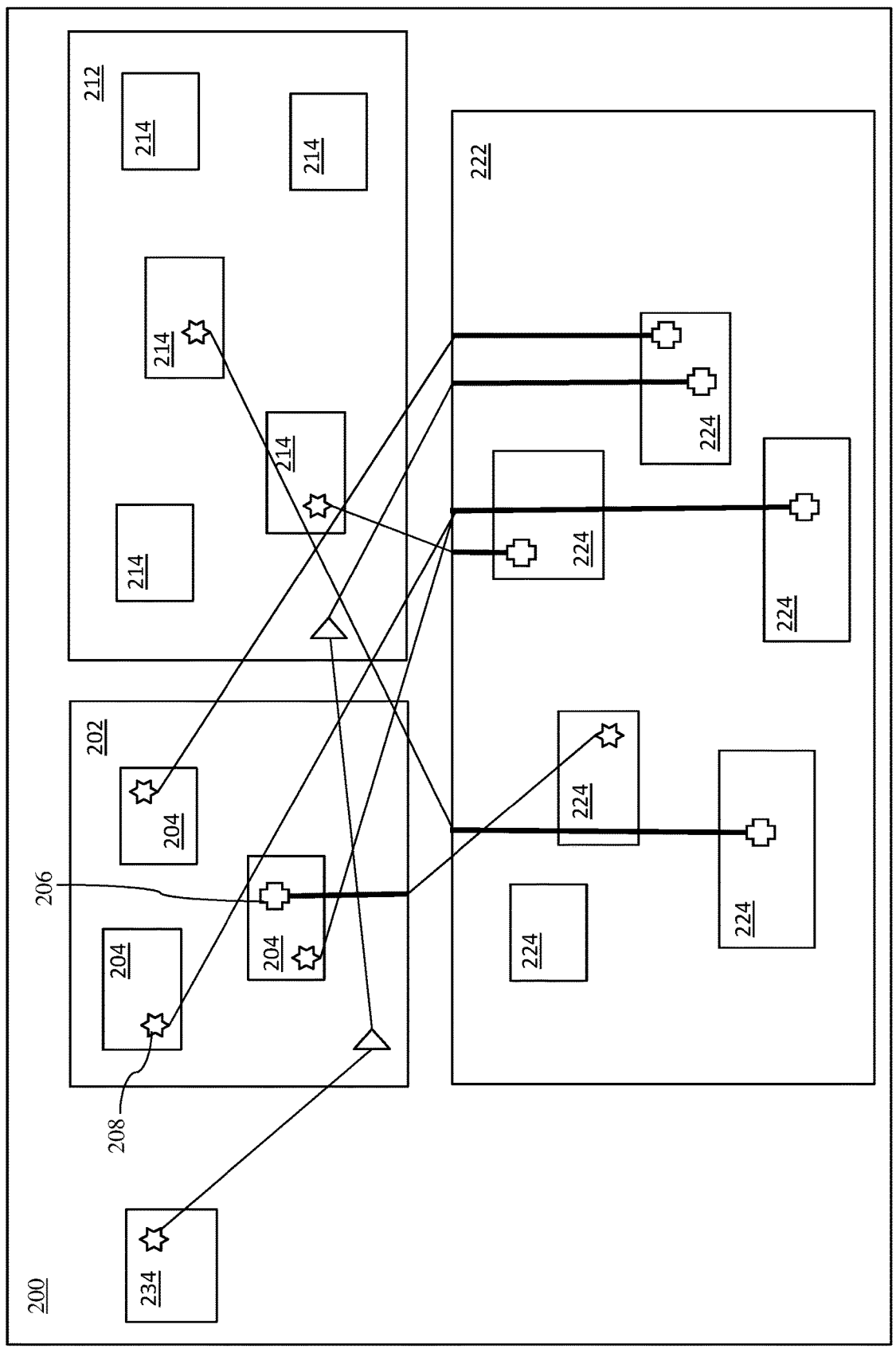
FIG. 2B illustrates an example second stage of a process for providing cross-hierarchical block pin placement within a hierarchical circuit design in accordance with one or more embodiments of the present invention.

As shown at block 104, the method includes aligning output pins to a correct edge from internal placement if the internal source is not a buffer or a latch. For example, as shown in FIG. 2B, the net of each output pin 206 of a bottom-level hierarchical block is aligned to the edge of the respective middle-level hierarchical block that the a bottom-level hierarchical block is positioned within, with the edge being the edge of the respective middle-level hierarchical block that is in the direction of the input pin 208 of the corresponding bottom-level hierarchical block. For example, as shown in FIG. 2B, the portion of the net connected to the output pin 206 of the bottom-level hierarchical block 204 in the first middle-level hierarchical block 202 is aligned with the bottom edge of the first middle-level hierarchical block 202, which is the edge that is in the direction of the middle-level hierarchical block (i.e., third middle-level hierarchical block 222) that contains the bottom-level hierarchical block with the corresponding input pin 208. According to some embodiments, aligning the output pin means aligning the portion of the net connected to the output pin 206 that is within the respective middle-level hierarchical block to have a path that intersects the edge of the respective middle-level hierarchical block at a perpendicular angle (i.e., smallest distance). As shown in FIG. 2B, this alignment is performed in relation to each output pin and its corresponding net of each bottom-level hierarchical block placed within any middle-level hierarchical block. For ease of representation, the nets of the aligned output pins 206 are represented in bold in FIG. 2B.

Figure 2C:
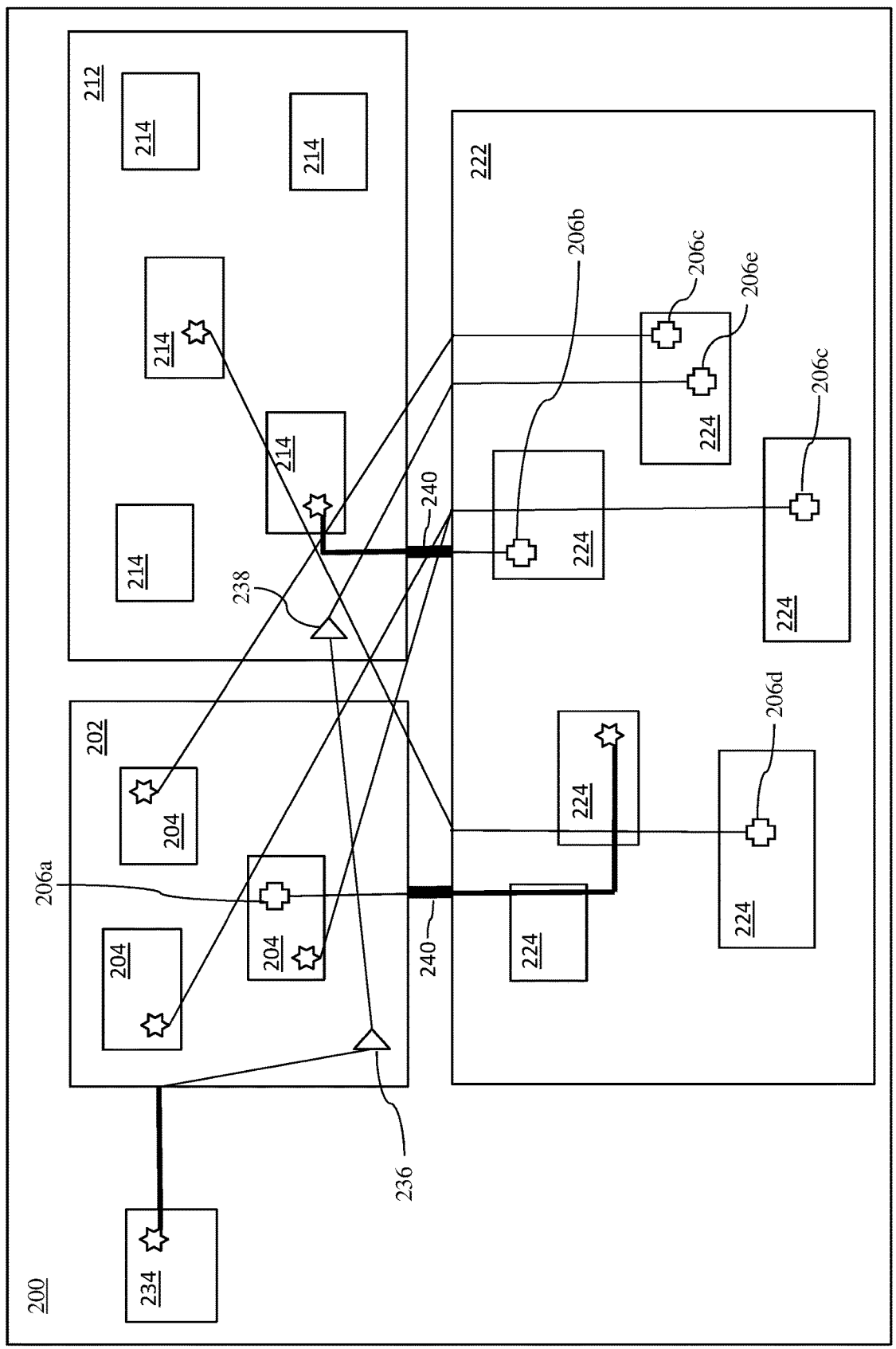
FIG. 2C illustrates an example third stage of a process for providing cross-hierarchical block pin placement within a hierarchical circuit design in accordance with one or more embodiments of the present invention.

As shown at block 106, the method includes determining whether source/output pins are placed within the boundary of the respective middle-level hierarchical block that contains the bottom-level hierarchical block having the corresponding input pin 208 of each output pin 206. For example, as shown in FIG. 2C, a first output pin 206a and a second output pin 206b are each positioned within the horizontal boundary of the middle-level hierarchical blocks that contain the input pins 208 of their respective corresponding bottom-level hierarchical block (i.e., first output pin 206a is vertically aligned within the horizontal boundary of the third middle-level hierarchical block 222 and second output pin 206b is vertically aligned with the horizontal boundary of the second middle-level hierarchical block 212). In contrast, a set of third output pins 206c and a fourth output pin 206d are not positioned within the horizontal boundary of the middle-level hierarchical blocks that contain the input pins 208 of their respective corresponding bottom-level hierarchical blocks (i.e., third output pins 206c are not vertically aligned within the horizontal boundary of the first middle-level hierarchical block 202 and fourth output pin 206d is not vertically aligned with the horizontal boundary of the second middle-level hierarchical block 212). According to the example shown in FIG. 2C, a fifth output pin 206e is in a bottom-level hierarchical block 224 of the third middle-level hierarchical block 222, but it ultimately connects (via two latches) to the input pin of the external bottom-level hierarchical block 234 that is not contained within any middle-level hierarchical block. However, this fifth output pin 206e may be considered to be within the boundary of the respective middle-level hierarchical block that contains the bottom-level hierarchical block that is the closest anchor point (i.e., an intermediate point that the route must travel through) of the route (i.e., the second middle-level hierarchical block 212, which contains the latch 238). If the system determines that the source/output pin of a given bottom-level hierarchical block is placed within the boundary of the respective middle-level hierarchical block that contains the bottom-level hierarchical block having the corresponding input pin 208, then the method may continue to block 108 with respect to that bottom-level hierarchical block (and any others). For bottom-level hierarchical blocks in which the system determines that the source/output pins are not placed within the respective boundary, then the method may proceed to block 110 with respect to those bottom-level hierarchical blocks.

As shown at block 108, the method includes aligning input pins to placed external source pins. For example, as shown by the lines in bold in FIG. 2C, the nets connected to input pins 208 that correspond to output pins 206a and 206b are aligned to the edge of their respective middle-level hierarchical blocks at a point where they align with the previously aligned portions of the nets that connect to the corresponding output pins in the other middle-level hierarchical blocks. As shown in FIG. 2C, the method can include placing middle-level hierarchical pins 240 between the respective middle-level hierarchical blocks at the points where the nets align on the edges of the respective middle-level hierarchical blocks. Although the nets that are internal to the various middle-level hierarchical blocks are depicted as having right angle paths, it will be understood that this is only for the ease of representation and the path of the net internal to a middle-level hierarchical block can have different shapes. Furthermore, as shown in FIG. 2C, the method can include aligning the input pin and net (shown in bold) of the external bottom-level hierarchical block 234 to the edge of the first middle-level hierarchical block 202 as the first middle-level hierarchical block 202 contains the first anchor point of the route between (i.e., the latch 236) the external bottom-level hierarchical block 234 to the corresponding bottom-level hierarchical block 224.

Figure 2D:
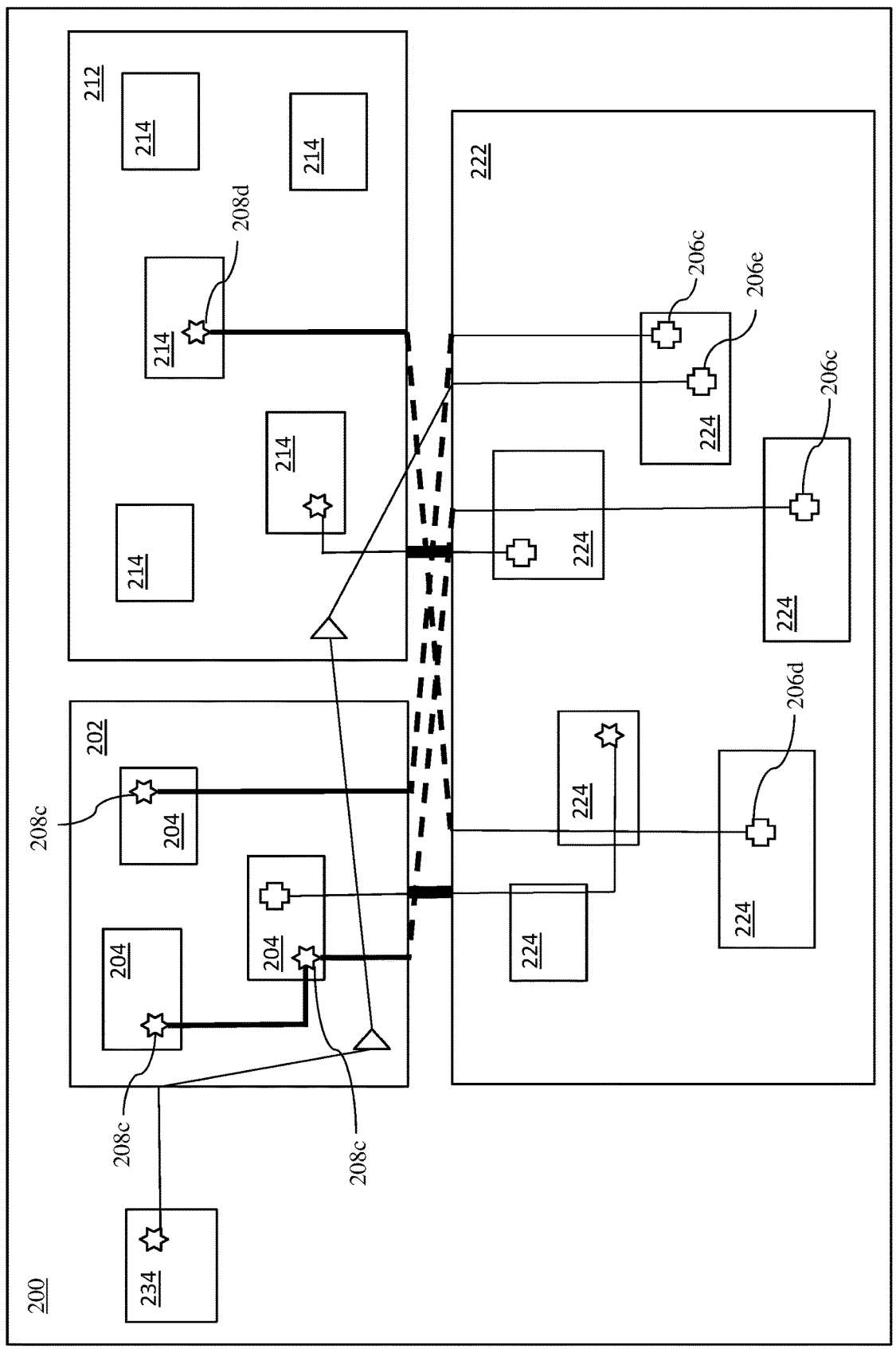
FIG. 2D illustrates an example fourth stage of a process for providing cross-hierarchical block pin placement within a hierarchical circuit design in accordance with one or more embodiments of the present invention.
Figure 2E:
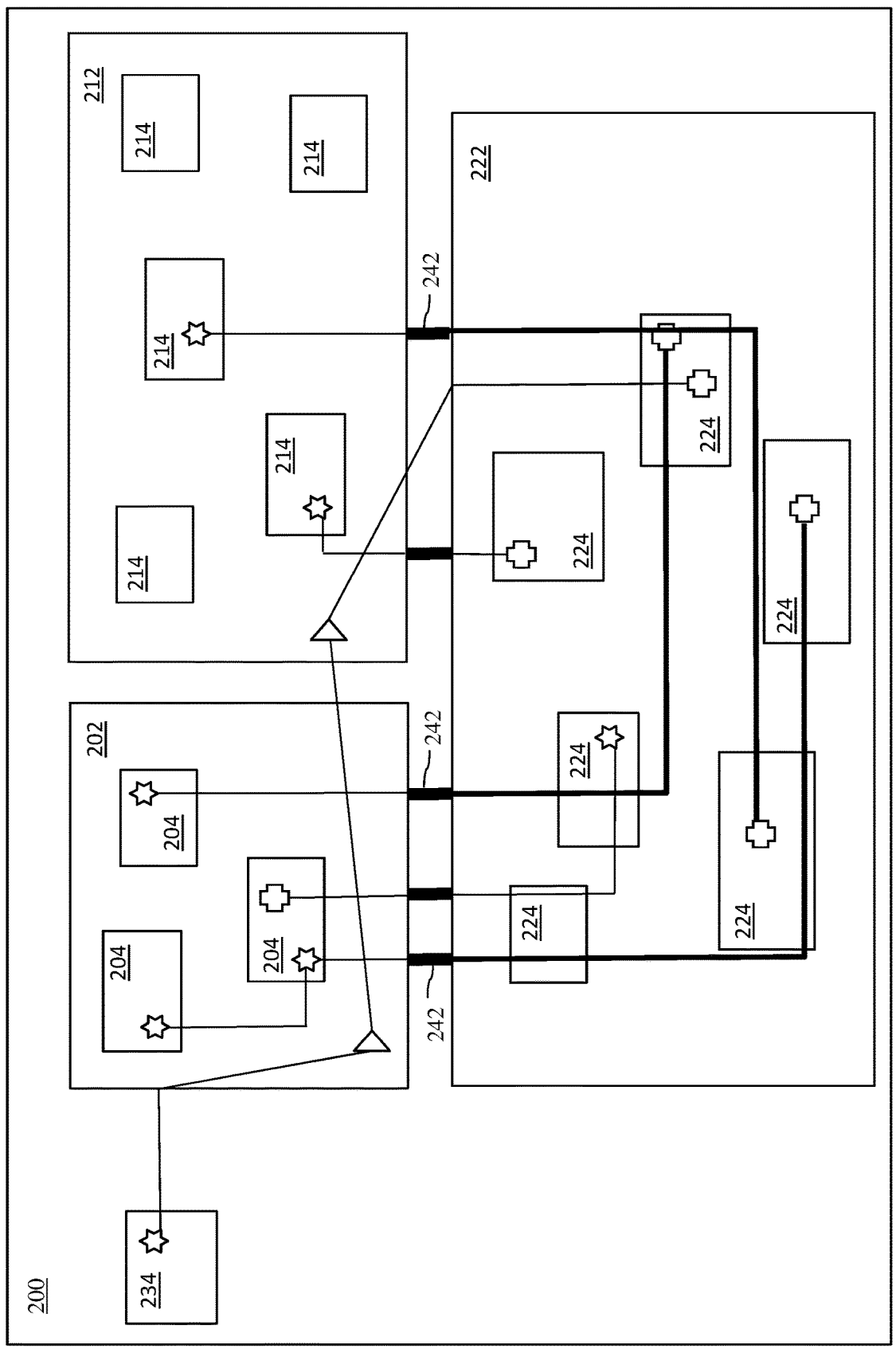
FIG. 2E illustrates an example fifth stage of a process for providing cross-hierarchical block pin placement within a hierarchical circuit design in accordance with one or more embodiments of the present invention.

As shown at block 110, the method includes aligning input pins to the correct edge based on internal placement in a manner similar to that of the aligning of output pins to a correct edge performed in block 104. Thus, for example, as shown in FIG. 2D, the input pins 208c, 208d of bottom-level hierarchical blocks (and their nets internal to the respective middle-level hierarchical blocks) are aligned to the edges of their respective bottom-level hierarchical blocks in the direction of the respective middle-level hierarchical block that contains the respective output pin of the corresponding bottom-level hierarchical block. The alignment of the input pins and their corresponding nets are shown in bold in FIG. 2D. Further, dashed bolded lines depict the theoretical connection between the respective middle-level hierarchical blocks for each net. As can be seen in FIG. 2D, these theoretical connections each span a relatively long distance diagonally across the gap between the middle-level hierarchical blocks' pins, which is not desirable. Thus, to solve this, as shown at block 112, the method includes snapping source (i.e., output) pins to sink (i.e., input) pins that are not aligned. For example, as shown in FIG. 2E, this is achieved by realigning the output pins 206c, 206d along the edge of the respective middle-level hierarchical block so that it aligns with the alignment of the corresponding input pins. This realignment is represented by the bolded nets shown in FIG. 2E. As shown, after this realignment takes place, each of these nets now aligns with points on either side of adjacent middle-level hierarchical blocks that are aligned or proximate with one another. The method includes placing middle-level hierarchical pins 242 at these alignments.

Figure 2F:
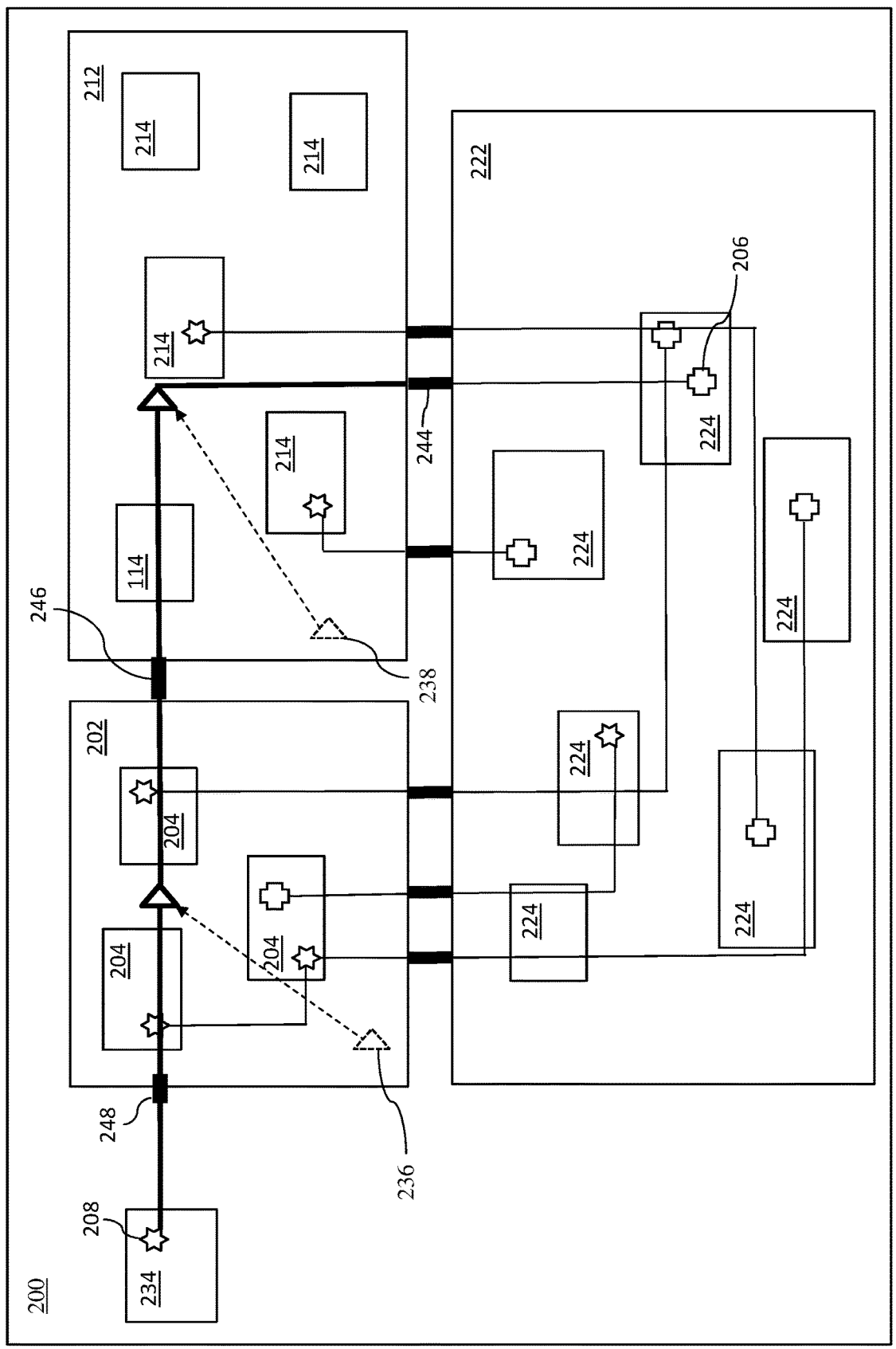
FIG. 2F illustrates an example sixth stage of a process for providing cross-hierarchical block pin placement within a hierarchical circuit design in accordance with one or more embodiments of the present invention.

As shown at block 114, the method includes generating latch subways. According to some embodiments, a "latch subway" refers to a route or path from an output pin 206 of a bottom-level hierarchical block to an input pin 208 of a corresponding bottom-level hierarchical block that passes through one or more intermediate middle-level hierarchical blocks by virtue of being connected to one more latches (or buffers) positioned within those middle-level hierarchical blocks. For example, as shown in FIG. 2F, the output pin 206 of a bottom-level hierarchical block 224 positioned within the third middle-level hierarchical block 222 has a route that ultimately terminates at the input pin 208 of the external bottom-level hierarchical block 234 but the route also passes through the second middle-level hierarchical block 212 and first middle-level hierarchical block 202 because the route passes through latches 236, 238. Thus, the portion of the route that passes through the two intermediate middle-level hierarchical blocks 202, 212 can be considered to be a "subway" that ultimately connects the route between the external bottom-level hierarchical block 234 and the bottom-level hierarchical block 224 positioned within the third middle-level hierarchical block 222. The flattening of the latches/buffers allows the system to "see through" the latches so that the overall route between the output pin 206 of a bottom-level hierarchical block 224 and the input pin 208 of the external bottom-level hierarchical block 234 is visible to the system, which allows the system to identify the intermediate middle-level hierarchical blocks through which the "subway" exists. This also eliminates any anchor points within these middle-level hierarchical blocks 202, 212, since any subway latch or buffer needs to be placed with respect to the pins, and would not have an optimal placement without the pins already being placed.

According to some embodiments, the positions of middle-level hierarchical pins used to facilitate the latch subway can be determined by aligning a given middle-level hierarchical pin 240 to an internal (i.e., internal to a bottom-level hierarchical block) output pin 206 or input pin 208 (i.e., source or sink) if possible. Thus, as shown in FIG. 2F, a first middle-level hierarchical pin 244 can be positioned between edges of the second middle-level hierarchical block 212 and the third middle-level hierarchical block 222 at a point that vertically aligns with the output pin 206 of the bottom-level hierarchical block 224. Likewise, a second middle-level hierarchical pin 246 positioned between edges of the second middle-level hierarchical block 212 and the first middle-level hierarchical block 202 and a third middle-level hierarchical pin 248 positioned at an edge of the first middle-level hierarchical block 202 can be positioned at a height along the edges of the middle-level hierarchical blocks that aligns with the input pin 208 of the external bottom-level hierarchical block 234. As shown, the placement of the middle-level hierarchical pins can occur irrespective to the alignment of the buffers 236, 238. FIG. 2F shows that, for the purpose of placing the middle-level hierarchical pins, the buffers 236, 238 can be thought of as being moved to align with the middle-level hierarchical pin placements, however they are not actually moved in this process, the assumption being that they will move to the optimal location when the middle-level hierarchical blocks are subsequently built. Thus, in this manner, the method 100 can identify locations on the edges of middle-level hierarchical blocks to achieve a placement of middle-level hierarchical pins that can result in improved timing and congestion characteristics of the overall circuit design.

Figure 3:
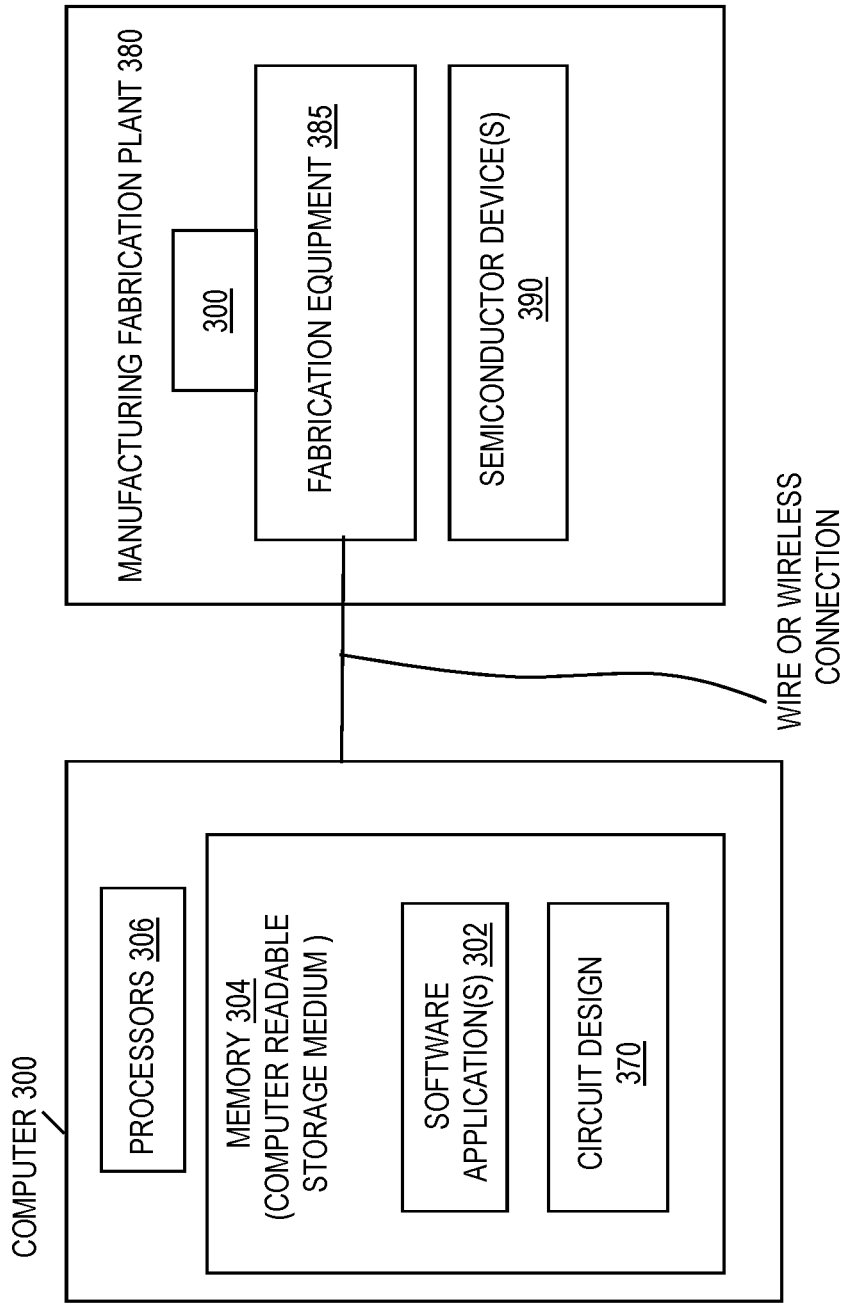
FIG. 3 depicts a system of a computer system integrated with a manufacturing fabrication plant according to one or more embodiments of the invention.

FIG. 3 According to some embodiments, a circuit design (e.g., a circuit layout or semiconductor layout) that includes various hierarchical blocks, such as the example top-level hierarchical block 200, middle-level hierarchical blocks 202, 212, 222 and bottom-level hierarchical blocks 204, 214, 224 shown in FIGS. 2A through 2F can be generated using the computer system 300 shown in FIG. 3. Although the circuit design shown in the examples depicted in FIGS. 2A through 2F represents a particular configuration of hierarchical blocks, those of skill in the art will recognize that a circuit design could be made up of a variety of different configurations and number of blocks. Further, it should be understood that the example of the circuit design shown in FIGS. 2A through 2F may represent only a very small portion of a much larger circuit design. The computer system 300 has one or more software applications 302 configured to function and implement operations as discussed herein. For example, software applications 302 may include hierarchical pin placement routines for determining locations along edges of middle-level hierarchical blocks to place middle-level hierarchical pins and modifying the circuit design to insert one or more middle-level hierarchical pins into the design.

According to some embodiments, software applications 302 can include other routines that may operate to fill in and/or reconfigure aspects of a circuit design and/or semiconductor layout (e.g., place and fill routines for placing functional cells and fill cells). A semiconductor layout can be constructed by the software application 302 of the computer 300 to build the semiconductor device (e.g., an integrated circuit). The software applications 302 include, integrate, are coupled to, and/or function as electronic design automation (EDA), also referred to as electronic computer-aided design (ECAD). Electronic design automation is a category of software tools for designing electronic systems such as integrated circuits and printed circuit boards. The tools work together in a design flow that chip designers use to design and analyze entire semiconductor chips. In some implementations, the computer 300 is coupled to, integrated with, and/or part of the fabrication equipment 385 at the manufacturing fabrication plant 380 (so as to communicate with and/or control operations of the fabrication equipment 385) to thereby fabricate semiconductor device(s) 390 as depicted in FIG. 3, as understood by one skilled in the art.

The computer 300 includes one or more processors 306 configured to execute one or more software applications 302 in memory 304. The computer 300 receives input of a design 370 for the semiconductor device 390, and the computer 300 is configured to develop/form the semiconductor layout for the semiconductor device in order to build the semiconductor device. The semiconductor layout is a physical design released to the manufacturing fabrication (Fab) plant 380 and physically fabricated by the fabrication equipment 385 to produce the semiconductor device. The manufacturing fabrication plant 380 builds the photo mask from the semiconductor layout as a physical design, and then builds the actual product using the photo mask. The product is an integrated circuit (i.e., semiconductor device 390) on a wafer according to the semiconductor layout (physical design). There may be numerous integrated circuits on a wafer, and each integrated circuit may be diced into an individual chip.

Figure 4:
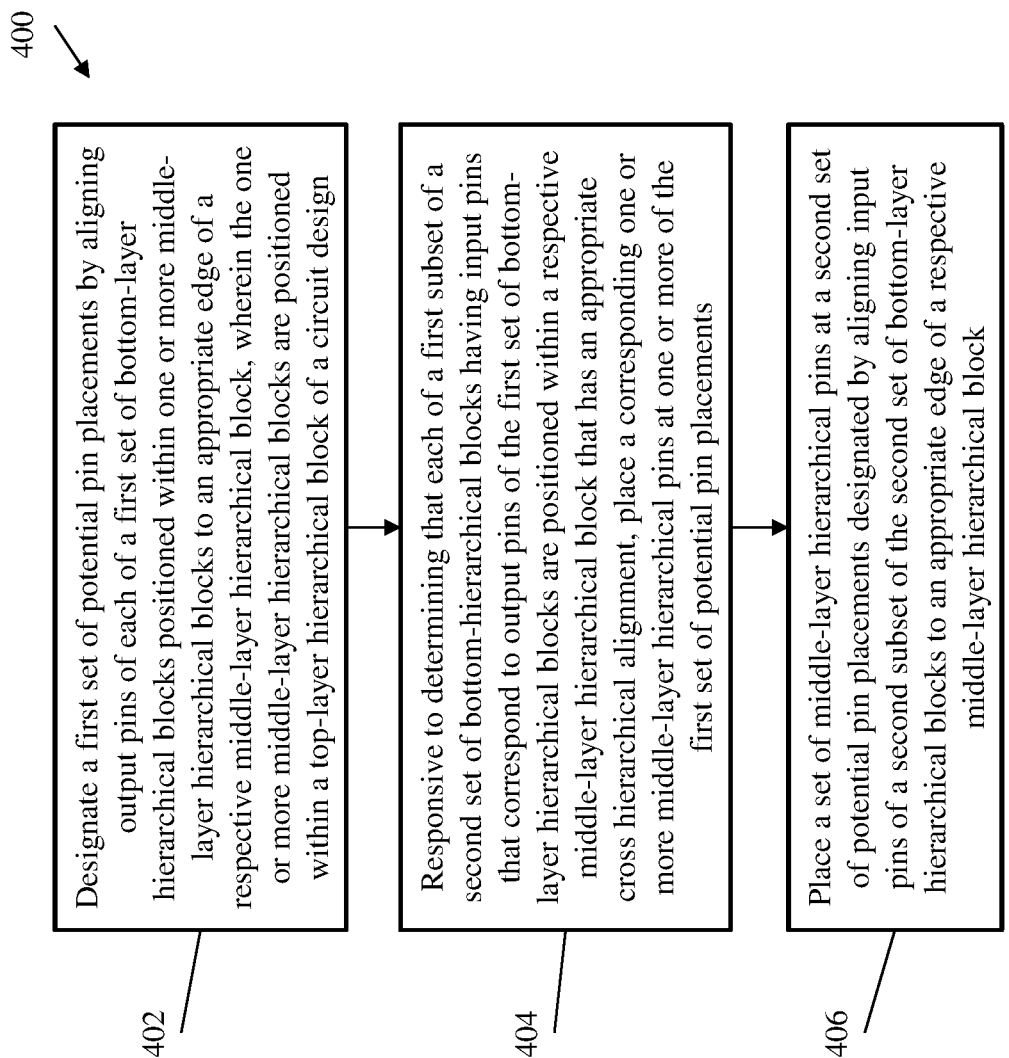
FIG. 4 illustrates another flow diagram of a process for providing cross-hierarchical block pin placement in accordance with one or more embodiments of the present invention.

Turning now to FIG. 4, a flow diagram of a method 400 for providing cross-hierarchical block pin placement in accordance with an embodiment is shown. In one or more embodiments of the present invention, the method 400 may be embodied in software that is executed by computer elements included in computer 300 shown in FIG. 3, or by computer elements located within a network that may reside in the cloud, such as the cloud computing environment 50 described herein above and illustrated in FIGS. 5 and 6. In other embodiments, the computer elements may reside on a computer system or processing system, such as the processing system 700 described herein above and illustrated in FIG. 7, or in some other type of computing or processing environment.

The method 400 begins at block 402 and includes designating (e.g., via computer 300) a first set of potential pin placements by aligning output pins of each of a first set of bottom-level hierarchical blocks (e.g., such as blocks 204, 214, 224 shown in FIGS. 2A-2F) positioned within one or more middle-level hierarchical blocks (e.g., such as blocks 202, 212, 222 shown in FIGS. 2A-2F) to an edge of a respective middle-level hierarchical block. The edge of the respective middle-level hierarchical block can be the edge of the middle-level hierarchical block that is adjacent to an edge of an adjacent middle-level hierarchical block that contains a bottom-level hierarchical block that has an input pin that corresponds to (i.e., is connected with via a route/net) the output pin of a given one of the first set of bottom-level hierarchical blocks. The first set of bottom-level hierarchical blocks can be bottom-level hierarchical blocks that each have at least one output pin. The one or more middle-level hierarchical blocks can be positioned within a top-level hierarchical block (e.g., such as block 200 shown in FIGS. 2A-2F) of a circuit design.

According to some embodiments, designating the first set of potential pin placements by aligning output pins of each of a first set of bottom-level hierarchical blocks positioned within one or more middle-level hierarchical blocks to an edge of a respective middle-level hierarchical block can include, for each of the first set of bottom-level hierarchical blocks: identifying a target direction, selecting an edge that is disposed in the target direction away from the bottom-level hierarchical block of the first set of bottom-level hierarchical blocks as being the edge, and locating a point on the edge of the middle-level hierarchical block that aligns with the output pin. The target direction can be a north, south, east or west direction of an adjacent middle-level hierarchical block to the respective middle-level hierarchical block that includes a corresponding bottom-level hierarchical block having an input pin that corresponds to the output pin of the bottom-level hierarchical block of the first set of bottom-level hierarchical blocks. According to some embodiments, the edge can be an edge of the middle-level hierarchical block that contains the bottom-level hierarchical block having the output pin that is adjacent to an edge of a different middle-level hierarchical block that contains a bottom-level hierarchical block that has the corresponding input pin that connects the route between the two bottom-level hierarchical blocks. According to some embodiments, locating a point on the edge of the middle-level hierarchical block that aligns with the output pin can include locating a point on the edge of the middle-level hierarchical block that is positioned at an intersection of the edge and perpendicular line that extends from the edge to the output pin.

As shown at block 404, the method includes placing (e.g., via computer 300) a corresponding one or more middle-level hierarchical pins at one or more of the first set of potential pin placements in response to determining that each of a first subset of a second set of bottom-level hierarchical blocks having input pins that correspond to the output pins of the first set of bottom-level hierarchical blocks are positioned within a respective middle-level hierarchical block that has a cross hierarchical alignment. According to some embodiments, a cross hierarchical alignment can mean that the bottom-level hierarchical block having the input pin is aligned within the boundary of the middle-level hierarchical block that contains the bottom-level hierarchical block that has the output pin (or vice versa if determining a cross hierarchical alignment of the output pin to the input pin). In other words, if the position of an input pin of a bottom-level hierarchical block aligns within the boundary (e.g., the horizontal width of the respective middle-level hierarchical blocks in the example shown in FIG. 2C) when viewed from the opposite direction as the target direction of the middle-level hierarchical block that contains the corresponding output pin, then a middle-level hierarchical pin can be placed at the potential pin placement that was identified by the alignment of the corresponding output pin performed at block 402. According to some embodiments, if the position of an input pin of a bottom-level hierarchical block does not align within the boundary of the middle-level hierarchical block that contains the corresponding output pin, then the potential pin placement that was identified by the alignment of the corresponding output pin performed at block 402 will be overridden as described below with respect to block 406. The second set of bottom-level hierarchical blocks can be bottom-level hierarchical blocks that each have at least one input pin.

According to some embodiments, determining that each of a first subset of a second set of bottom-level hierarchical blocks having input pins that correspond to the output pins of the first set of bottom-level hierarchical blocks are positioned within a respective middle-level hierarchical block that has a cross hierarchical alignment can include, for each bottom-level hierarchical block of the first subset of a second set of bottom-level hierarchical blocks, determining that a path of a net that extends from the input pin directly to a potential pin placement of the first set of potential pin placements associated with a bottom-level hierarchical block having a corresponding output pin does not pass through a different middle-level hierarchical block. In other words, to determine that a given bottom-level hierarchical block having an input pin has a cross-hierarchical alignment, the system may determine that that route (i.e., the path of the net) between the input pin of one bottom-level hierarchical block to the output pin of a corresponding bottom-level hierarchical block is not required to pass through an intermediate middle-level hierarchical block (e.g., by virtue of being connected to a latch or buffer positioned within an intermediate middle-level hierarchical block). According to some embodiments, a path of the net that extends from the input pin directly to a potential pin placement of the first set of potential pin placements can be a path that is of the shortest possible distance between the input pin and the potential pin placement.

According to some embodiments, the first subset of the second set of bottom-level hierarchical blocks and the second subset of the second set of bottom-level hierarchical blocks are mutually exclusive. According to some embodiments, the first subset of the second set of blocks can be bottom-level hierarchical blocks that each have at least one input pin that have a cross-hierarchical alignment (e.g., are positioned within the boundary of the middle-level hierarchical block containing the corresponding output pin) whereas the second subset of the second set of bottom-level hierarchical blocks can be bottom-level hierarchical blocks that each have at least one input pin that do not have a cross-hierarchical alignment.

As shown at block 406, the method includes placing (e.g., via computer 300) a set of middle-level hierarchical pins at a second set of potential pin placements designated by aligning input pins of a second subset of the second set of bottom-level hierarchical blocks to an edge of a respective middle-level hierarchical block.

According to some embodiments, placing each middle-level hierarchical pin of the corresponding one or more middle-level hierarchical pins and the set of middle-level hierarchical pins can include positioning a middle-level hierarchical pin in a position disposed between an edge of two middle-level hierarchical blocks that respectively include a bottom-level hierarchical blocks having an output pin and a corresponding bottom-level hierarchical block having an input pin to connect the two middle-level hierarchical blocks (for example, as depicted by middle-level hierarchical pins 240, 242, 244, 246 in FIGS. 2C, 2E and 2F).

According to some embodiments, the method 400 may further include flattening (e.g., via computer 300) through one or more latches and buffers within the circuit design to remove hierarchical boundaries along one or more routes associated with the one or more latches and buffers such that, for example, the entire route of a net between a given output pin and corresponding input pin is visible, including any intermediate latches or buffers that the route runs though. As described above, flattening through all latches and buffers can allow for the determination for locations of middle-level hierarchical pins to be placed for "subways" that involve routes that connect to latches or buffers in intermediate middle-level hierarchical blocks.

In some embodiments, the method may further include, for each net between an output pin of a bottom-level hierarchical block and an input pin of a corresponding bottom-level hierarchical block, tagging the net (or route) with an use layer. Each middle-level hierarchical pin can be placed on a respective use layer corresponding to a respective associated net.

According to some embodiments, the method 400 may further include for a bottom-level hierarchical block positioned externally to all middle-level hierarchical blocks that has a net that is connected to one or more latches or buffers in middle-level hierarchical blocks other than a middle-level hierarchical block that includes a bottom-level hierarchical block that is connected to an end of the net, placing (e.g., via computer 300) a first middle-level hierarchical pin on an edge of a first middle-level hierarchical block containing a first latch or buffer of the one or more latches or buffers (for example, as shown by middle-level hierarchical pin 248 in FIG. 2F) and placing one or more additional middle-level hierarchical pins between each pair of middle-level hierarchical blocks along a path of the net (for example, as shown by middle-level hierarchical pins 244, 246 in FIG. 2F).

Additional processes may also be included. It should be understood that the processes depicted in FIGS. 1 and 4 represent illustrations, and that other processes may be added or existing processes may be removed, modified, or rearranged without departing from the scope and spirit of the present disclosure.

Figure 5:
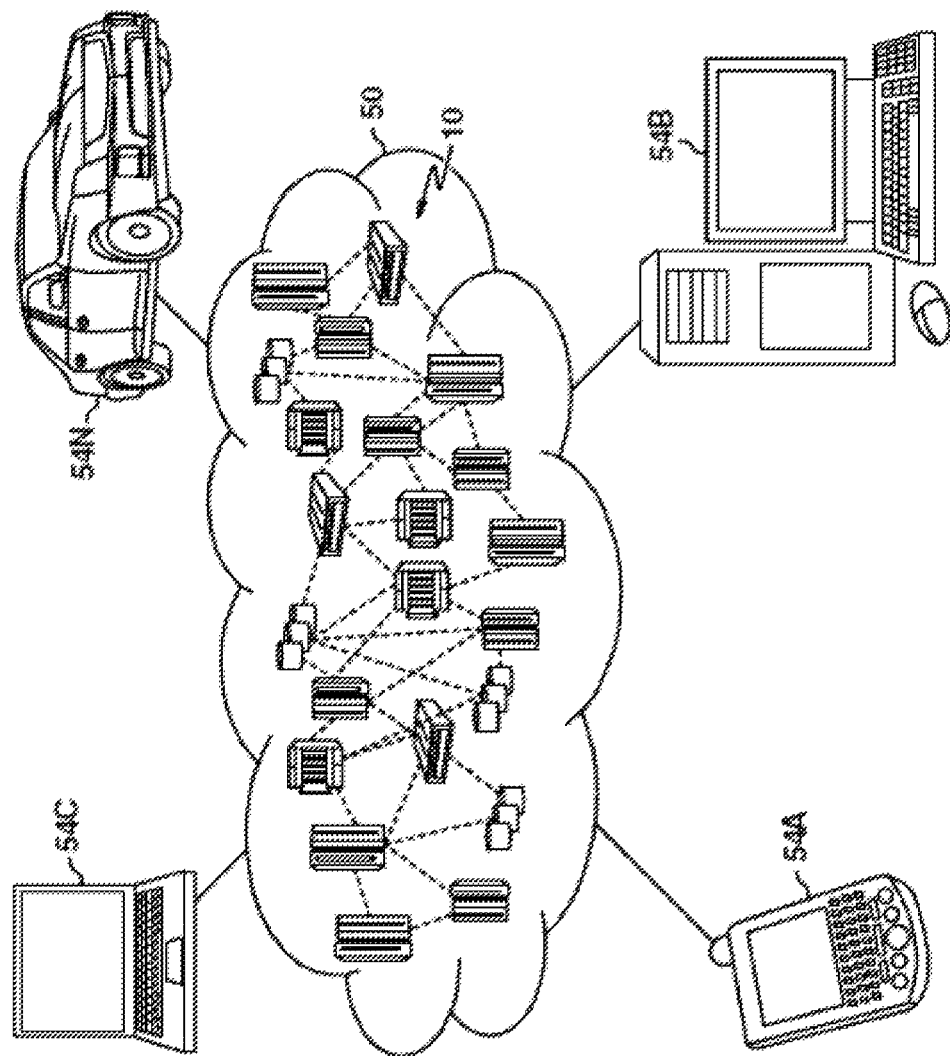
FIG. 5 illustrates a cloud computing environment according to one or more embodiments of the present invention.
Figure 6:
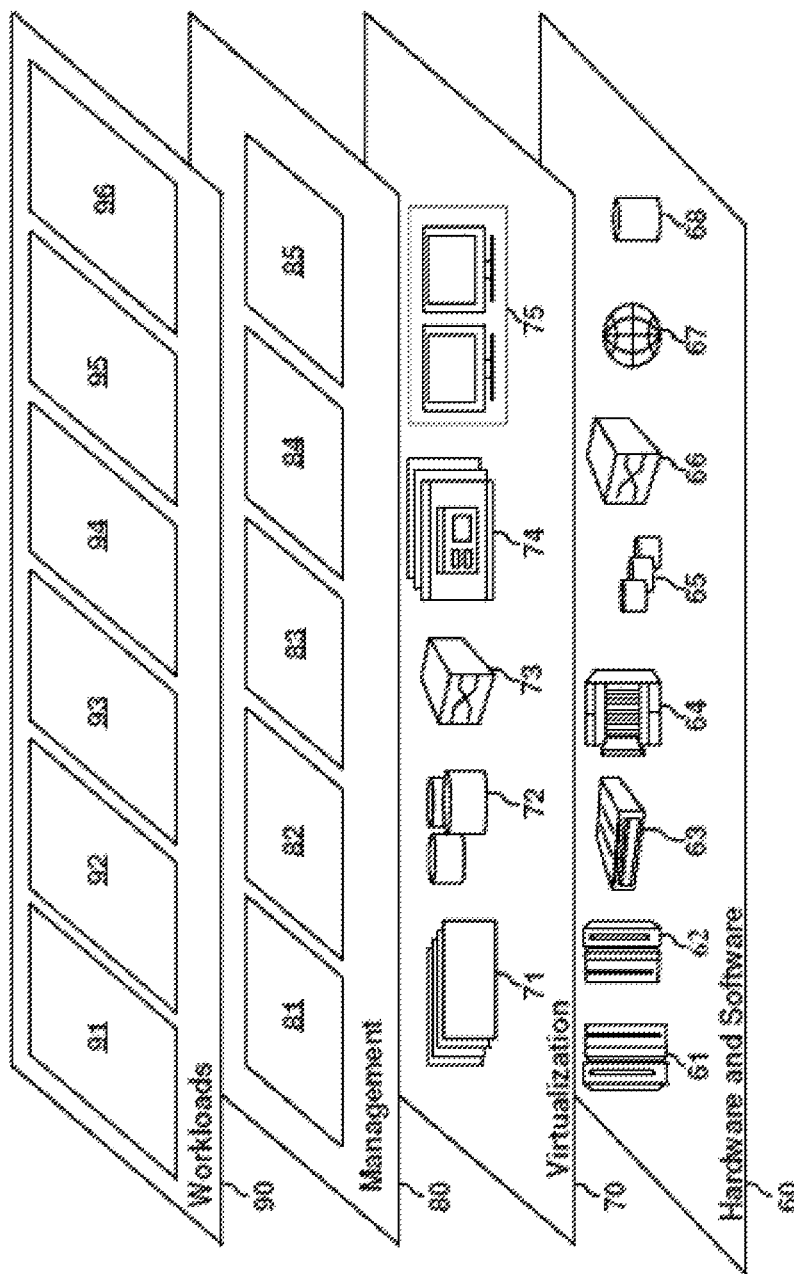
FIG. 6 illustrates abstraction model layers according to one or more embodiments of the present invention.

FIG. 5 depicts a cloud computing environment according to one or more embodiments of the present invention. FIG. 6 depicts abstraction model layers according to one or more embodiments of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing cross-hierarchical block pin placement 96.

Figure 7:
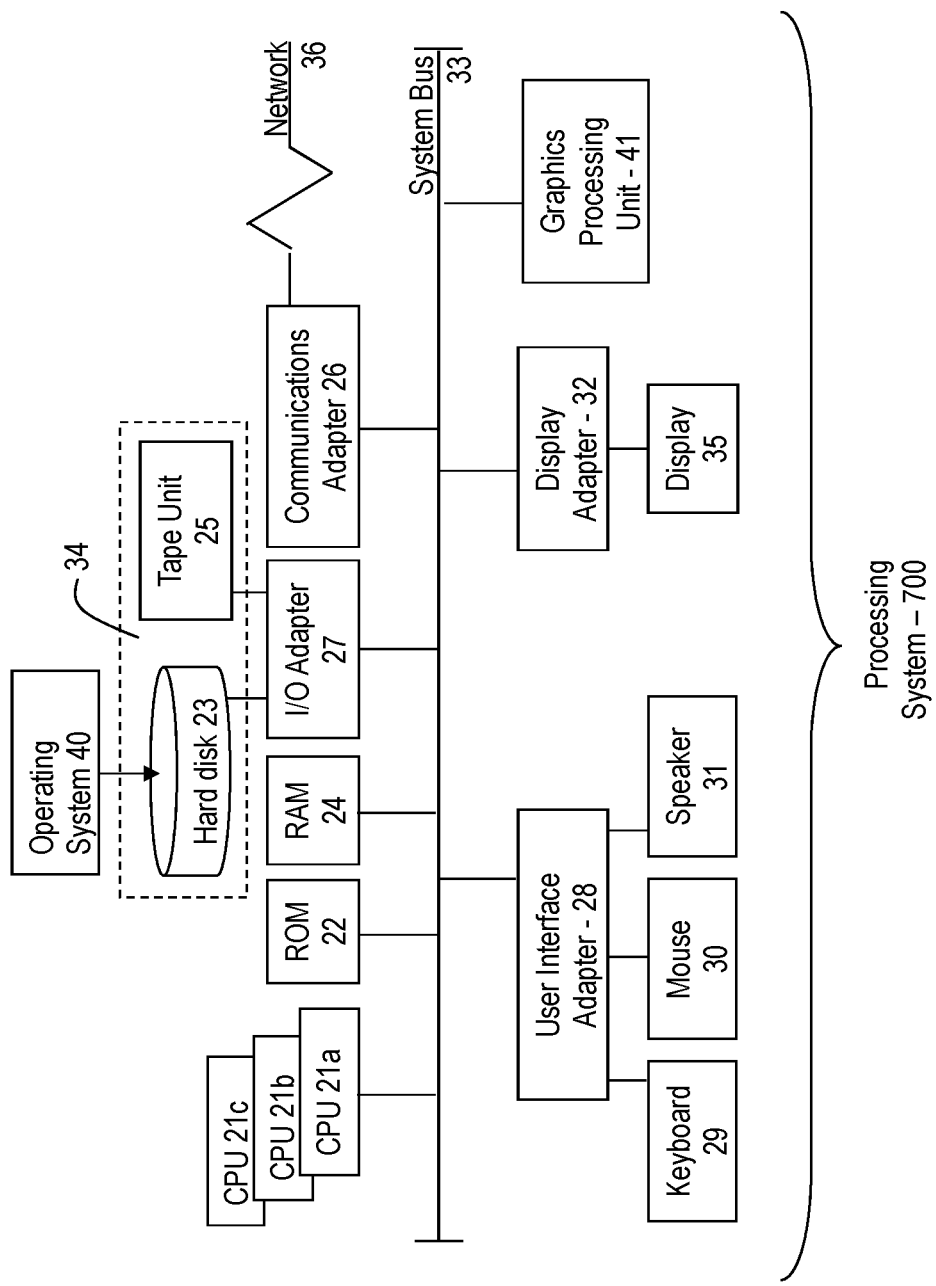
FIG. 7 illustrates a block diagram of a computer system for use in implementing one or more embodiments of the present invention.

FIG. 7 depicts a processing system for implementing one or more embodiments of the present invention.

It is understood that one or more embodiments of the present invention are capable of being implemented in conjunction with any other type of computing environment now known or later developed. For example, FIG. 7 depicts a block diagram of a processing system 700 for implementing the techniques described herein. In accordance with one or more embodiments of the present invention, computer 300 and/or system 700 can be an example of a cloud computing node 10 of FIG. 5. In the embodiment shown in FIG. 7, processing system 700 has one or more central processing units (processors) 21a, 21b, 21c, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 700.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 700 can be stored in mass storage 34. The RAM 24, ROM 22, and mass storage 34 are examples of memory 19 of the processing system 700. A network adapter 26 interconnects system bus 33 with an outside network 36 enabling the processing system 700 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 700 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 700 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in processing system 700.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

As previously noted herein, for the sake of brevity, conventional techniques related to semiconductor device and integrated circuit (IC) fabrication may or may not be described in detail herein. By way of background, however, a more general description of the semiconductor device fabrication processes that can be utilized in implementing one or more embodiments of the present invention will now be provided. Although specific fabrication operations used in implementing one or more embodiments of the present invention can be individually known, the described combination of operations and/or resulting structures of the present invention are unique. Thus, the unique combination of the operations described in connection with the fabrication of a semiconductor device according to the present invention utilizes a variety of individually known physical and chemical processes performed on a semiconductor (e.g., silicon) substrate, some of which are described in the immediately following paragraphs.

In general, the various processes used to form a microchip that will be packaged into an IC fall into four general categories, namely, film deposition, removal/etching, semiconductor doping and patterning/lithography. Deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, atomic layer deposition (ALD) among others. Removal/etching is any process that removes material from the wafer. Examples include etch processes (either wet or dry), and chemical-mechanical planarization (CMP), and the like. Semiconductor doping is the modification of electrical properties by doping, for example, transistor sources and drains, generally by diffusion and/or by ion implantation. These doping processes are followed by furnace annealing or by rapid thermal annealing (RTA). Annealing serves to activate the implanted dopants. Films of both conductors (e.g., poly-silicon, aluminum, copper, etc.) and insulators (e.g., various forms of silicon dioxide, silicon nitride, etc.) are used to connect and isolate transistors and their components. Selective doping of various regions of the semiconductor substrate allows the conductivity of the substrate to be changed with the application of voltage. By creating structures of these various components, millions of transistors can be built and wired together to form the complex circuitry of a modern microelectronic device. Semiconductor lithography is the formation of three-dimensional relief images or patterns on the semiconductor substrate for subsequent transfer of the pattern to the substrate. In semiconductor lithography, the patterns are formed by a light sensitive polymer called a photo-resist. To build the complex structures that make up a transistor and the many wires that connect the millions of transistors of a circuit, lithography and etch pattern transfer steps are repeated multiple times. Each pattern being printed on the wafer is aligned to the previously formed patterns and slowly the conductors, insulators and selectively doped regions are built up to form the final device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    designating a first set of potential pin placements by aligning output pins of each of a first set of bottom-level hierarchical blocks positioned within one or more middle-level hierarchical blocks to an edge of a respective middle-level hierarchical block, wherein the one or more middle-level hierarchical blocks are positioned within a top-level hierarchical block of a circuit design;
    responsive to determining that each of a first subset of a second set of bottom-level hierarchical blocks having input pins that correspond to the output pins of the first set of bottom-level hierarchical blocks are positioned within a respective middle-level hierarchical block that has a cross hierarchical alignment, placing a corresponding one or more middle-level hierarchical pins at one or more of the first set of potential pin placements; and
    placing a set of middle-level hierarchical pins at a second set of potential pin placements designated by aligning input pins of a second subset of the second set of bottom-level hierarchical blocks to an edge of a respective middle-level hierarchical block.

2. The computer-implemented method of claim 1 further comprising:
    flattening through one or more latches and buffers within the circuit design to remove hierarchical boundaries along one or more routes associated with the one or more latches and buffers.

3. The computer-implemented method of claim 2 further comprising:
    for each net between an output pin of a bottom-level hierarchical block and an input pin of a corresponding bottom-level hierarchical block, tagging the net with a use layer; and
    wherein each middle-level hierarchical pin is placed on a respective use layer corresponding to a respective associated net.

4. The computer-implemented method of claim 1, wherein designating the first set of potential pin placements by aligning output pins of each of a first set of bottom-level hierarchical blocks positioned within one or more middle-level hierarchical blocks to an edge of a respective middle-level hierarchical block comprises, for each of the first set of bottom-level hierarchical blocks:
    identifying a target direction, wherein the target direction comprises a north, south, east or west direction of an adjacent middle-level hierarchical block to the respective middle-level hierarchical block that includes a corresponding bottom-level hierarchical block having an input pin that corresponds to the output pin of the bottom-level hierarchical block of the first set of bottom-level hierarchical blocks; and
    locating a point on the edge of the middle-level hierarchical block that aligns with the output pin, wherein the edge is disposed in the target direction away from the bottom-level hierarchical block of the first set of bottom-level hierarchical blocks.

5. The computer-implemented method of claim 4, wherein locating a point on the edge of the middle-level hierarchical block that aligns with the output pin comprises locating a point on the edge of the middle-level hierarchical block that is positioned at an intersection of the edge and perpendicular line extending from the edge to the output pin.

6. The computer-implemented method of claim 1, wherein determining that each of a first subset of a second set of bottom-level hierarchical blocks having input pins that correspond to the output pins of the first set of bottom-level hierarchical blocks are positioned within a respective middle-level hierarchical block that has a cross hierarchical alignment comprises, for each bottom-level hierarchical block of the first subset of a second set of bottom-level hierarchical blocks, determining that:
    a path of a net that extends from the input pin directly to a potential pin placement of the first set of potential pin placements associated with a bottom-level hierarchical block having a corresponding output pin does not pass through a different middle-level hierarchical block.

7. The computer-implemented method of claim 6, wherein a path of the net that extends from the input pin directly to a potential pin placement of the first set of potential pin placements comprises a path that is of a shortest possible distance between the input pin and the potential pin placement.

8. The computer-implemented method of claim 1, wherein the first subset of the second set of bottom-level hierarchical blocks and the second subset of the second set of bottom-level hierarchical blocks are mutually exclusive.

9. The computer-implemented method of claim 1, wherein placing each middle-level hierarchical pin of the corresponding one or more middle-level hierarchical pins and the set of middle-level hierarchical pins comprises positioning a middle-level hierarchical pin in a position disposed between an edge of two middle-level hierarchical blocks that respectively include a bottom-level hierarchical blocks having an output pin and a corresponding bottom-level hierarchical block having an input pin to connect the two middle-level hierarchical blocks.

10. The computer-implemented method of claim 1 further comprising:
for a bottom-level hierarchical block positioned externally to all middle-level hierarchical blocks that has a net that is connected to one or more latches or buffers in middle-level hierarchical blocks other than a middle-level hierarchical block that includes a bottom-level hierarchical block that is connected to an end of the net, placing a first middle-level hierarchical pin on an edge of a first middle-level hierarchical block containing a first latch or buffer of the one or more latches or buffers; and
placing one or more additional middle-level hierarchical pins between each pair of middle-level hierarchical blocks along a path of the net.

11. A system comprising:
a memory having computer readable instructions; and
one or more processors for executing the computer readable instructions, the computer readable instructions controlling the one or more processors to perform operations comprising:
designating a first set of potential pin placements by aligning output pins of each of a first set of bottom-level hierarchical blocks positioned within one or more middle-level hierarchical blocks to an edge of a respective middle-level hierarchical block, wherein the one or more middle-level hierarchical blocks are positioned within a top-level hierarchical block of a circuit design;
responsive to determining that each of a first subset of a second set of bottom-level hierarchical blocks having input pins that correspond to the output pins of the first set of bottom-level hierarchical blocks are positioned within a respective middle-level hierarchical block that has a cross hierarchical alignment, placing a corresponding one or more middle-level hierarchical pins at one or more of the first set of potential pin placements; and
placing a set of middle-level hierarchical pins at a second set of potential pin placements designated by aligning input pins of a second subset of the second set of bottom-level hierarchical blocks to an edge of a respective middle-level hierarchical block.

12. The system of claim 11 further comprising:
flattening through one or more latches and buffers within the circuit design to remove hierarchical boundaries along one or more routes associated with the one or more latches and buffers.

13. The system of claim 12 further comprising:
for each net between an output pin of a bottom-level hierarchical block and an input pin of a corresponding bottom-level hierarchical block, tagging the net with a use layer; and
wherein each middle-level hierarchical pin is placed on a respective use layer corresponding to a respective associated net.

14. The system of claim 11, wherein designating the first set of potential pin placements by aligning output pins of each of a first set of bottom-level hierarchical blocks positioned within one or more middle-level hierarchical blocks to an edge of a respective middle-level hierarchical block comprises, for each of the first set of bottom-level hierarchical blocks:
identifying a target direction, wherein the target direction comprises a north, south, east or west direction of an adjacent middle-level hierarchical block to the respective middle-level hierarchical block that includes a corresponding bottom-level hierarchical block having an input pin that corresponds to the output pin of the bottom-level hierarchical block of the first set of bottom-level hierarchical blocks; and
locating a point on the edge of the middle-level hierarchical block that aligns with the output pin, wherein the edge is disposed in the target direction away from the bottom-level hierarchical block of the first set of bottom-level hierarchical blocks.

15. The system of claim 14, wherein locating a point on the edge of the middle-level hierarchical block that aligns with the output pin comprises locating a point on the edge of the middle-level hierarchical block that is positioned at an intersection of the edge and perpendicular line extending from the edge to the output pin.

16. The system of claim 11, wherein determining that each of a first subset of a second set of bottom-level hierarchical blocks having input pins that correspond to the output pins of the first set of bottom-level hierarchical blocks are positioned within a respective middle-level hierarchical block that has a cross hierarchical alignment comprises, for each bottom-level hierarchical block of the first subset of a second set of bottom-level hierarchical blocks, determining that:
a path of a net that extends from the input pin directly to a potential pin placement of the first set of potential pin placements associated with a bottom-level hierarchical block having a corresponding output pin does not pass through a different middle-level hierarchical block.

17. A computer program product comprising a non-transitory computer readable storage medium having program instructions embodied therewith, the program instructions executable by a computer processor to cause the computer processor to perform a method comprising:
designating a first set of potential pin placements by aligning output pins of each of a first set of bottom-level hierarchical blocks positioned within one or more middle-level hierarchical blocks to an edge of a respective middle-level hierarchical block, wherein the one or more middle-level hierarchical blocks are positioned within a top-level hierarchical block of a circuit design;
responsive to determining that each of a first subset of a second set of bottom-level hierarchical blocks having input pins that correspond to the output pins of the first set of bottom-level hierarchical blocks are positioned within a respective middle-level hierarchical block that has a cross hierarchical alignment, placing a corresponding one or more middle-level hierarchical pins at one or more of the first set of potential pin placements; and
placing a set of middle-level hierarchical pins at a second set of potential pin placements designated by aligning input pins of a second subset of the second set of bottom-level hierarchical blocks to an edge of a respective middle-level hierarchical block.

18. The computer program product of claim 17 further comprising:
flattening through one or more latches and buffers within the circuit design to remove hierarchical boundaries along one or more routes associated with the one or more latches and buffers.

19. The computer program product of claim 18 further comprising:

for each net between an output pin of a bottom-level hierarchical block and an input pin of a corresponding bottom-level hierarchical block, tagging the net with a use layer; and wherein each middle-level hierarchical pin is placed on a respective use layer corresponding to a respective associated net.

20. The computer program product of claim 17, wherein designating the first set of potential pin placements by aligning output pins of each of a first set of bottom-level hierarchical blocks positioned within one or more middle-level hierarchical blocks to an edge of a respective middle-level hierarchical block comprises, for each of the first set of bottom-level hierarchical blocks:

identifying a target direction, wherein the target direction comprises a north, south, east or west direction of an adjacent middle-level hierarchical block to the respective middle-level hierarchical block that includes a corresponding bottom-level hierarchical block having an input pin that corresponds to the output pin of the bottom-level hierarchical block of the first set of bottom-level hierarchical blocks; and locating a point on the edge of the middle-level hierarchical block that aligns with the output pin, wherein the edge is disposed in the target direction away from the bottom-level hierarchical block of the first set of bottom-level hierarchical blocks.

\* \* \* \* \*